(12) United States Patent
Wachholz-Prill

(10) Patent No.: US 7,257,579 B2
(45) Date of Patent: Aug. 14, 2007

(54) MODELING AND USING BUSINESS RULES

(75) Inventor: Andre Wachholz-Prill, Bellheim (DE)

(73) Assignee: SAP Aktiengesellschaft, Walldorf (DE)

( * ) Notice: Subject to any disclaimer, the term of this patent is extended or adjusted under 35 U.S.C. 154(b) by 579 days.

(21) Appl. No.: 10/751,315

(22) Filed: Jan. 2, 2004

(65) Prior Publication Data

US 2005/0149344 A1   Jul. 7, 2005

(51) Int. Cl.
- G06F 7/00 (2006.01)
- G06F 17/30 (2006.01)
- G06F 17/00 (2006.01)

(52) U.S. Cl. ............................................. 707/9; 707/2
(58) Field of Classification Search ................. 707/3, 707/2, 9, 10, 104.1; 705/1
See application file for complete search history.

(56) References Cited

U.S. PATENT DOCUMENTS

| | | | |
|---|---|---|---|
| 6,438,544 B1 * | 8/2002 | Grimmer et al. | 707/5 |
| 6,578,037 B1 * | 6/2003 | Wong et al. | 707/10 |
| 2004/0210445 A1 * | 10/2004 | Veronese et al. | 705/1 |

OTHER PUBLICATIONS

Business Semantics of Business Rules Request for Proposal, *Object Management Group*, Jul. 22, 2003, 50 pages.
http://www.cling.gu.se/datorinfo/old/sicstus/sicstus3/sicstus/sicstus_5.html—"The Prolog Language", printed from the Internet on Nov. 5, 2003, 14 pages.
http://help.sap.com/saphelp_crm40/helpdata/en/8b/06f837aea75351e10000009b38f8cf/frameset.htm—"Pricing," printed from the Internet on Dec. 29, 2003, 1 page.
http://help.sap.com/saphelp_crm40/helpdata/en/8b/06f837aea75351e10000009b38f8cf/frameset.htm—"Maintaining Pricing in Business Transactions," printed from the Internet on Dec. 29, 2003, 1 page.
http://help.sap.com/saphelp_crm40/helpdata/en/8b/06f837aea75351e10000009b38f8cf/frameset.htm—"Maintaining Conditions," printed from the Internet on Dec. 29, 2003, 1 page.
http://help.sap.com/saphelp_crm40/helpdata/en/8b/06f837aea75351e10000009b38f8cf/frameset.htm—"Implementing New Pricing," printed from the Internet on Dec. 29, 2003, 1 page.
http://help.sap.com/saphelp_crm40/helpdata/en/8b/06f837aea75351e10000009b38f8cf/frameset.htm—"Displaying Detail Screens," printed from the Internet on Dec. 29, 2003, 1 page.

(Continued)

*Primary Examiner*—Sam Rimell
*Assistant Examiner*—Jared Bibbee
(74) *Attorney, Agent, or Firm*—Fish & Richardson P.C.

(57) ABSTRACT

A method comprises determining a rule type needed for selecting an action to be performed with regard to a data object, identifying an access procedure associated with the rule type, retrieving query attributes from a context associated with the data object, searching an attribute database with a query attributes, and, if the query attributes match a first attribute set, accessing a first rule that belongs to the rule type and that is identified by the first attribute set. Each of a plurality of rules in a rule database is capable of being identified by any attribute set in the attribute database. Input functions for modeling the rules and creating the databases may be provided. Use of the rules can be simulated.

33 Claims, 5 Drawing Sheets

OTHER PUBLICATIONS http://help.sap.com/saphelp_crm40/helpdata/en/8b/06f837aea75351e10000009b38f8cf/frameset.htm—"Condition Analysis," printed from the Internet on Dec. 29, 2003, 1 page.

http://help.sap.com/saphelp_crm40/helpdata/en/8b/06f837aea75351e10000009b38f8cf/frameset.htm—"The Pricing Process," printed from the Internet on Dec. 29, 2003, 2 pages.

http://help.sap.com/saphelp_crm40/helpdata/en/8b/06f837aea75351e10000009b38f8cf/frameset.htm—"Setting Up Pricing," printed from the Internet on Dec. 29, 2003, 1 page.

http://help.sap.com/saphelp_crm40/helpdata/en/8b/06f837aea75351e10000009b38f8cf/frameset.htm—"Field Catalog," printed from the Internet on Dec. 29, 2003, 3 pages.

http://help.sap.com/saphelp_crm40/helpdata/en/8b/06f837aea75351e10000009b38f8cf/frameset.htm—"Condition Tables," printed from the Internet on Dec. 29, 2003, 2 pages.

http://help.sap.com/saphelp_crm40/helpdata/en/8b/06f837aea75351e10000009b38f8cf/frameset.htm—"Condition Types," printed from the Internet on Dec. 29, 2003, 1 page.

http://help.sap.com/saphelp_crm40/helpdata/en/8b/06f837aea75351e10000009b38f8cf/frameset.htm—"Access Sequences," printed from the Internet on Dec. 29, 2003, 1 page.

http://help.sap.com/saphelp_crm40/helpdata/en/8b/06f837aea75351e10000009b38f8cf/frameset.htm—Hierarchical Accesses, printed from the Internet on Dec. 29, 2003, 1 page.

http://help.sap.com/saphelp_crm40/helpdata/en/8b/06f837aea75351e10000009b38f8cf/frameset.htm—"Pricing Procedures," printed from the Internet on Dec. 29, 2003, 1 page.

http://help.sap.com/saphelp_crm40/helpdata/en/8b/06f837aea75351e10000009b38f8cf/frameset.htm—"Differences in Pricing in CRM and R/3," printed from the Internet on Dec. 29, 2003, 1 page.

http://help.sap.com/saphelp_crm40/helpdata/en/8b/06f837aea75351e10000009b38f8cf/frameset.htm—"Differences in Pricing in SAP CRM and SAP R/3," printed from the Internet on Dec. 29, 2003, 1 page.

http://help.sap.com/saphelp_crm40/helpdata/en/8b/06f837aea75351e10000009b38f8cf/frameset.htm—"Differences in the Data Model," printed from the Internet on Dec. 29, 2003, 2 pages.

http://help.sap.com/saphelp_crm40/helpdata/en/8b/06f837aea75351e10000009b38f8cf/frameset.htm—Differences in Routines (Formulas and Requirements), printed from the Internet on Dec. 29, 2003, 1 page.

http://help.sap.com/saphelp_crm40/helpdata/en/8b/06f837aea75351e10000009b38f8cf/frameset.htm—"Conditions," printed from the Internet on Dec. 29, 2003, 1 page.

http://help.sap.com/saphelp_crm40/helpdata/en/8b/06f837aea75351e10000009b38f8cf/frameset.htm—"Condition Maintenance," printed from the Internet on Dec. 29, 2003, 1 page.

http://help.sap.com/saphelp_crm40/helpdata/en/8b/06f837aea75351e10000009b38f8cf/frameset.htm—"General Condition Maintenance," printed from the Internet on Dec. 29, 2003, 1 page.

http://help.sap.com/saphelp_crm40/helpdata/en/8b/06f837aea75351e10000009b38f8cf/frameset.htm—"Creating Conditions," printed from the Internet on Dec. 29, 2003, 1 page.

http://help.sap.com/saphelp_crm40/helpdata/en/8b/06f837aea75351e10000009b38f8cf/frameset.htm—"Create With Template," printed from the Internet on Dec. 29, 2003, 1 page.

http://help.sap.com/saphelp_crm40/helpdata/en/8b/06f837aea75351e10000009b38f8cf/frameset.htm—"Selecting Conditions," printed from the Internet on Dec. 29, 2003, 1 page.

http://help.sap.com/saphelp_crm40/helpdata/en/8b/06f837aea75351e10000009b38f8cf/frameset.htm—"Mass Data Changes," printed from the Internet on Dec. 29, 2003, 1 page.

http://help.sap.com/saphelp_crm40/helpdata/en/8b/06f837aea75351e10000009b38f8cf/frameset.htm—"Validity Periods," printed from the Internet on Dec. 29, 2003, 1 page.

http://help.sap.com/saphelp_crm40/helpdata/en/8b/06f837aea75351e10000009b38f8cf/frameset.htm—"Authorizations," printed from the Internet on Dec. 29, 2003, 1 page.

http://help.sap.com/saphelp_crm40/helpdata/en/8b/06f837aea75351e10000009b38f8cf/frameset.htm—"Integrated Condition Maintenance," printed from the Internet on Dec. 29, 2003, 2 pages.

http://help.sap.com/saphelp_crm40/helpdata/en/8b/06f837aea75351e10000009b38f8cf/frameset.htm—"Price List," printed from the Internet on Dec. 29, 2003, 1 page.

http://help.sap.com/saphelp_crm40/helpdata/en/8b/06f837aea75351e10000009b38f8cf/frameset.htm—"Price Agreements in Contracts," printed from the Internet on Dec. 29, 2003, 1 page.

http://help.sap.com/saphelp_crm40/helpdata/en/8b/06f837aea75351e10000009b38f8cf/frameset.htm—"Expiring Currencies," printed from the Internet on Dec. 29, 2003, 1 page.

http://help.sap.com/saphelp_crm40/helpdata/en/8b/06f837aea75351e10000009b38f8cf/frameset.htm—"Data Exchange for Conditions," printed from the Internet on Dec. 29, 2003, 1 page.

http://help.sap.com/saphelp_crm40/helpdata/en/8b/06f837aea75351e10000009b38f8cf/frameset.htm—"Data Transfer from the R/3 System (Download)," printed from the Internet on Dec. 29, 2003, 1 page.

http://help.sap.com/saphelp_crm40/helpdata/en/8b/06f837aea75351e10000009b38f8cf/frameset.htm—"Differences in Routines (Formulas and Requirements)," printed from the Internet on Dec. 29, 2003, 1 page.

http://help.sap.com/saphelp_crm40/helpdata/en/8b/06f837aea75351e10000009b38f8cf/frameset.htm—"Transferring Customizing Data," printed from the Internet on Dec. 29, 2003, 2 pages.

http://help.sap.com/saphelp_crm40/helpdata/en/8b/06f837aea75351e10000009b38f8cf/frameset.htm—"Copying Customizing Data into the CDB (Consolidated Data Base)," printed from the Internet on Dec. 29, 2003, 2 pages.

http://help.sap.com/saphelp_crm40/helpdata/en/8b/06f837aea75351e10000009b38f8cf/frameset.htm—"Transferring Master Data," printed from the Internet on Dec. 29, 2003, 2 pages.

http://help.sap.com/saphelp_crm40/helpdata/en/8b/06f837aea75351e10000009b38f8cf/frameset.htm—"Correction Possibilities for Copying Master Data," printed from the Internet on Dec. 29, 2003, 1 page.

http://help.sap.com/saphelp_crm40/helpdata/en/8b/06f837aea75351e10000009b38f8cf/frameset.htm—"Copying Master Data into the CDB," printed from the Internet on Dec. 29, 2003, 1 page.

http://help.sap.com/saphelp_crm40/helpdata/en/8b/06f837aea75351e10000009b38f8cf/frameset.htm—"Routines (Formulas and Requirements)," printed from the Internet on Dec. 29, 2003, 1 page.

http://help.sap.com/saphelp_crm40/helpdata/en/8b/06f837aea75351e10000009b38f8cf/frameset.htm—"Data Transfer to the R/3 System (Upload)," printed from the Internet on Dec. 29, 2003, 1 page.

http://help.sap.com/saphelp_crm40/helpdata/en/8b/06f837aea75351e10000009b38f8cf/frameset.htm—"Copying Master Data (from CRM to R/3)," printed from the Internet on Dec. 29, 2003, 2 pages.

http://help.sap.com/saphelp_crm40/helpdata/en/8b/06f837aea75351e10000009b38f8cf/frameset.htm—"Correction Options," printed from the Internet on Dec. 29, 2003, 1 page.

http://help.sap.com/saphelp_crm40/helpdata/en/8b/06f837aea75351e10000009b38f8cf/frameset.htm—"Using Data Integrity Manager for Conditions," printed from the Internet on Dec. 29, 2003, 1 page.

* cited by examiner

100A

Sales Order

Customer: A — 110
Product: 1 — 120
Quantity: 10 — 130
Shipping: — 140

Enter — 150

Sales Order

Customer: A
Product: 1
Quantity: 10
Shipping: Express FOB — 140

Edit — 160
Process — 170

*FIG. 1B*

| Rule Type | Rule Number | Rule Values | |
|---|---|---|---|
| | | Term 1 | Term 2 |
| Shipping Rule | 1 | Express | FOB |
| Shipping Rule | 2 | 24 Hour | FOB |
| Shipping Rule | 3 | Standard | FOB |
| | | | |
| | | | |

280B

Create Attribute Database

| Attribute Set | Query Attribute(s) | Identified Rule |
|---|---|---|
| 1 | (A, , ) | Shipping Rule #1 |
| 2 | ( ,1, ) | Shipping Rule #2 |
| 3 | (A,1, ) | Shipping Rule #3 |
| 4 | ( A,1, Monday) | Shipping Rule #2 |

Enter

Create Access Procedure

| Access Rule | Query Attribute(s) |
|---|---|
| 1 | (Customer, , ) |
| 2 | (Customer, Product, ) |
| 3 | ( Customer, Product, Day) |

Enter

*FIG. 6*

MODELING AND USING BUSINESS RULES

TECHNICAL FIELD

This description relates to modeling and using business rules.

BACKGROUND

Most business organizations use computer systems to handle their sales and other activities. For this purpose, they typically create data objects in the computer system corresponding to physical entities such as a particular customer or a specific product. The organization may then in the computer system register a sale by making a certain association between a product object and a customer object. The data objects are sometimes referred to as master data in the computer system. The manipulation of master data may be a precursor for an activity outside the system, such as actually delivering the physical product to the customer. Accordingly, actions are taken in the computer system that correspond to, and typically precede, activities that are external to the system.

A system of this type typically takes rules into account when performing the actions. The rules specify in which of several alternative ways the action should be performed in the specific situation. For example, there may be shipping rules that the system applies to determine whether to ship the current product by express or standard delivery. Rules are typically implemented to ensure that the processing is efficient and consistent.

These systems are configured so that the applicable rules relate to specific master data, such as to the customer object or to the product object. That is, when a sale is registered, the shipment terms may be proposed from the customer master data. This means that there is a specific shipping rule associated with the customer master data that can propose a shipping method, such as "all deliveries to this customer are shipped by air." It may happen, however, that shipping terms depend on the sold product. Some products cannot be shipped by air, for example. It has then been tried to have the product master data, not the customer master data, propose the shipment terms.

These approaches are associated with problems. Modeling a rule so that it relates to a specific instance of master data creates a static relationship. The rule may be taken into account whenever the particular object is present, which creates very little flexibility. There is also a problem if there is a rule that should be valid for several products, because it must then be set up for each of them. This results in redundant data in the computer system. Also, in the above example with the customer-based and product-based shipping rules, one attempted solution may be to create a new category of master data that depends from the combination of the customer object and the product object. However, this approach does not overcome the mentioned problems. While the rule now may take into account both the customer object and the product object, it provides no flexibility to depend from other circumstances, such as what day of the week the shipment is made. Also, the new master data category creates more redundant data in the system.

SUMMARY

The invention relates to modeling and using business rules. In a first general aspect, a method for use in a computer system capable of taking actions with regard to data objects comprises determining a rule type that is needed by a computer system in selecting a particular action to be taken with regard to a data object. An access procedure associated with the rule type is identified. The access procedure specifies which query attributes are to be used. The access procedure comprises a sequence of access rules, each of which access rules identifies at least one of the query attributes to be used. The query attributes are retrieved from a context associated with the data object. An attribute database is searched with at least one of the query attributes identified by a first access rule of the first access procedure. If the at least one of the query attributes identified by the first access rule matches a first attribute set in the attribute database, a first rule is accessed in a rule database. The first rule belongs to the rule type and is identified by the first attribute set. The first rule specifies the particular action to be taken by the computer system with regard to the data object. Each of a plurality of rules in the rule database is capable of being identified by any of a plurality of attribute sets in the attribute database.

If no matching attribute set exists when the attribute database is searched with the at least one of the query attributes identified by the first access rule, the attribute database may be searched with at least another one of the query attributes identified by a second access rule of the first access procedure. In selected embodiments, the second access rule identifies at least one of the query attributes that is also identified by the first access rule.

In a second general aspect, a computer system includes a rule database comprising a plurality of rules specifying particular actions that the computer system can take with regard to a data object. Each of the rules belongs to one of a plurality of rule types. The system includes an attribute database comprising a plurality of attribute sets. Each of the attribute sets identifies one of the plurality of rules in the rule database, wherein each of the plurality of rules is capable of being identified by any of the plurality of attribute sets. The system includes a plurality of access procedures specifying which query attributes are to be used in searching the attribute database. Each of the access procedures is associated with one of the plurality of rule types and comprises a sequence of access rules. Each of the access rules identifies at least one of the query attributes to be used.

In selected embodiments, a first attribute set in the attribute database includes one attribute. A first access procedure of the plurality of access procedures may include a first access rule and a second access rule, wherein the sequence may comprise that the first access rule be used before the second access rule. The first access rule may identify at least a first query attribute that the second access rule does not identify. The first access rule may identify at least a first query attribute that is also identified by the second access rule. The first access rule may identify a different number of the query attributes than does the second access rule, wherein the sequence comprises that the first access rule be used before the second access rule, and the second access rule may identify fewer of the query attributes than does the first access rule.

In selected embodiments, a system may include an electronic business transaction that relates to the data object and that specifies a first rule type among the plurality of rule types.

In a third general aspect, a computer system includes a first input function for a user to create a rule database comprising a plurality of rules that specify particular actions that the computer system can take with regard to a data object. The first input function provides that the user can specify one of a plurality of rule types for each of the rules. The system includes a second input function for the user to create an attribute database comprising a plurality of attribute sets. The second input function provides that the user can specify one of the plurality of rules in the rule database to be identified by each of the attribute sets. Each of the plurality of rules is capable of being identified by any of the plurality of attribute sets. The system includes a third input function for the user to create a plurality of access procedures specifying which query attributes are to be used in searching the attribute database. The third input function provides that the user can associate each of the access procedures with one of the plurality of rule types and define a sequence of access rules for each of the access procedures. The third input function further provides that the user can specify at least one of the query attributes to be identified by each of the access rules.

In selected embodiments, the user can perform a simulated access to at least one of the plurality of business rules. The simulated access may provide that the user can specify a first rule type of the plurality of rule types and specify the query attributes to be used, and the simulated access may result in a first rule of the plurality of rules being identified by a first attribute set of the plurality of attribute sets. In a simulated access, the second input function may provide that the user can modify the first attribute set to identify a different one of the plurality of rules. In a simulated access, the third input function may provide that the user can modify a first access procedure in which the first attribute set was matched with at least one of the query attributes.

Advantages of modeling and using business rules as described herein may include any or all of the following. More efficient use of business rules. Providing flexible relations between business rules and data objects. Reducing redundancy in rule-based processing. More efficient modeling of business rules.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 1A and B are conceptual screen displays of a sales order using a business rule;

FIG. 5 is a conceptual screen display of an input function for creating an attribute database that can be used with business rules;

FIG. 6 is a conceptual screen display of an input function for creating an access procedure for an attribute database.

Like reference numbers in the various drawings indicate like elements.

DETAILED DESCRIPTION

Figure 2:
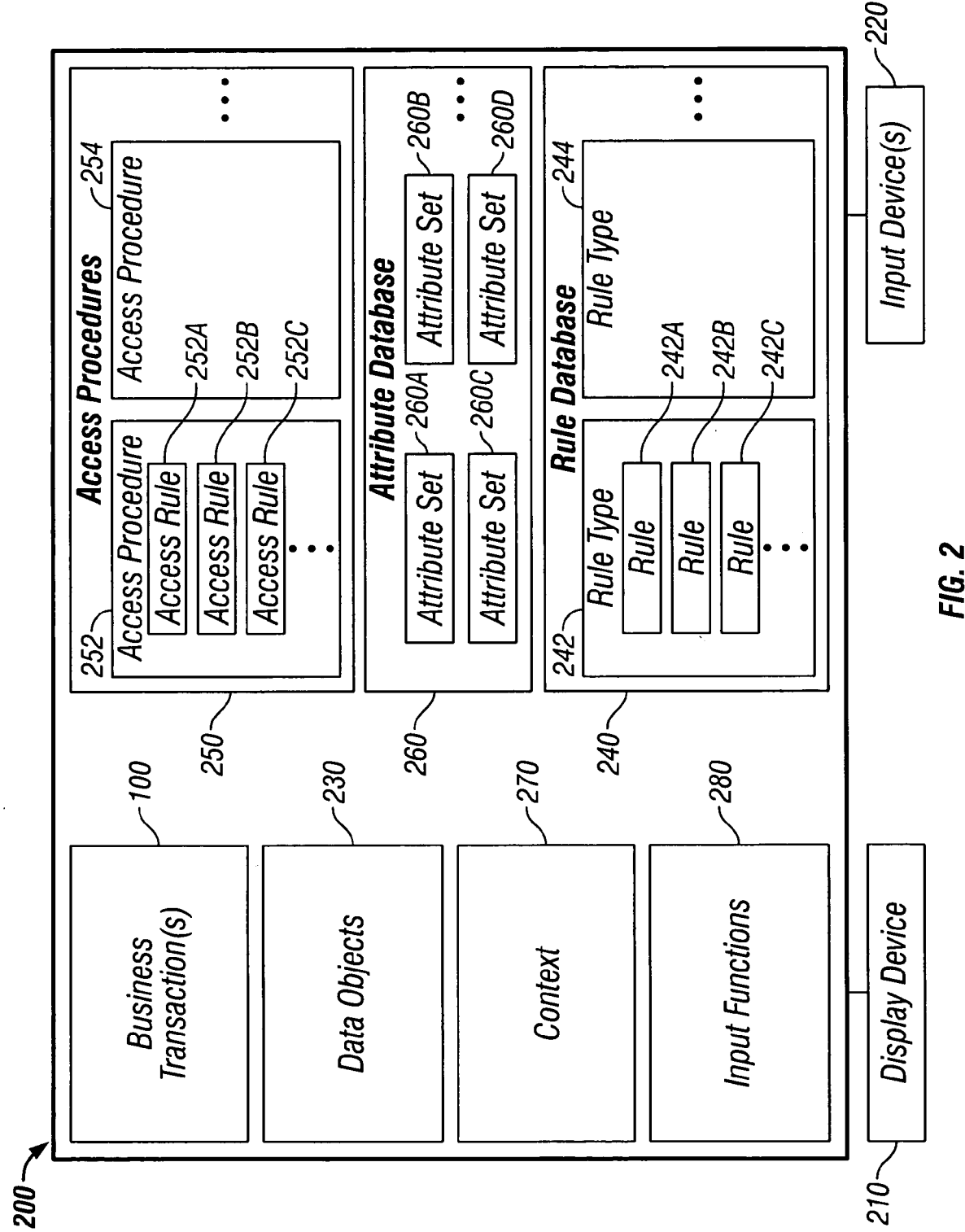
FIG. 2 is a block diagram of a computer system in which business rules can be modeled and used.

FIG. 1A shows a sales order 100A that can be displayed in a computer user interface. A person may enter information relevant to a sale in the sales order 100A to process the sale in a computer system. It will be understood that processing the sale may require several steps, including the input of more information than currently shown in sales order 100A. For brevity of this description, however, the sales order 100A is shown comprising a customer input field 110, a product input field 120 and a quantity input field 130. A "Shipping" output field 140 is presently empty because no specific shipping term has been specified for the sale to which the sales order 100A relates.

As shown in FIG. 1A, the user inputs a customer name "A", a product number "1" and a quantity "10" in the respective input fields 110, 120 and 130, meaning that customer A is ordering 10 items of product number 1. The user then activates an "Enter" input control 150 in the sales order 100A to trigger the system to propose shipping terms for this particular sale. The system receives the data entered in the input fields, which may be referred to as attributes of the rule to be applied, and determines which business rule to access, as will be described later. The result of accessing the business rule in this example is that specific shipping terms are identified.

FIG. 1B shows the sales order 100A after the system has accessed the applicable business rule. The shipping output field 140 now contains the information "Express FOB", meaning that the system proposes shipping the ordered products free-on-board (FOB) by express delivery. The sales order 100A provides an "Edit" input control 160 that the user can activate after changing any information entered in fields 110, 120 or 130 to prompt the system to determine the shipping term anew. The sales order 100A provides a "Process" input control 170 by which the user can accept the proposed shipping terms and continue processing the order.

FIG. 2 shows a computer system 200 in which business rules such as the one being applied in the above example can be modeled and used. The system 200 includes one or more business transactions 100, for example the sales order 100A. The user can interact with the system 200 through a display device 210 and input device(s) 220 operably connected thereto.

As illustrated by the above description of FIGS. 1A and B, processing business transaction(s) 100 may require the system 200 to find a business rule that applies to a specific customer or product. The system 200 includes data objects 230 that may correspond to any customer or product, for example. The outcome of using a particular business rule may be that the system 200 takes a specific action with regard to any of the data objects 230.

The above mentioned shipping rule is merely one example of a type of rule that can be used. Other rule types may be relevant depending on the particular business transaction 100 that is used. For example, when the business transaction 100 is sales order 100A, additional rules that may come into play are ones relating to how invoicing is done and what payment terms should apply. The system 200 includes a rule database 240 where a first rule type 242 comprises a plurality of rules 242A, 242B, and so on. For example, the first rule type 242 may be shipping rules. A second rule type 244 may similarly comprise one or more rules. The rule database 240 may include a plurality of rule types.

As another example, the business transaction 100 may provide scheduling of an appointment. In such a transaction, rules relating to available visiting hours and travel arrangements, to name just two examples, may come into play.

Any business transaction 100 may be capable of specifying a rule type to be used in a particular situation. For example, the sales order 100A specifies that a shipping rule should be used if the user activates the input control 150. As noted above, shipping rules may correspond to the first rule type 242.

The system 200 comprises access procedures 250 that specify which attributes are to be used in accessing the rule of the type specified by the transaction 100. The access procedures 250 are associated with specific ones of the rule types 242, 244, and so on. That is, a first access procedure 252 may be associated with the first rule type 242 and a second access procedure 254 may be associated with the second rule type 244. With reference again to the above example, one of the access procedures 250 may be associated with shipping rules.

The access procedures 250 comprise sequences of access rules that identify the attributes. A sequence comprises at least one access rule, and, if there are several, defines the order in which they are to be applied. Thus, the first access procedure 252 may comprise a sequence of first access rule 252A, second access rule 252B, third access rule 252C, and so on, to be applied in that order. The system need not always run through each access rule in the sequence, however. As will be described below, the system need only go through the sequence until it finds an access rule that lets the system find an applicable rule in the rule database 240.

If the first access procedure 252 is associated with shipping rules, for example, the first access rule 252A may specify that the system should use the customer name as an attribute. The second access rule 252B may identify the customer name and the product number as attributes. Similarly, the third access rule 252C may identify the customer name, product number, and current day of the week as attributes. Access rules will be referred to using the following notion:

First access rule: (Customer,);
Second access rule: (Customer, Product,); and
Third access rule: (Customer, Product, Day).

The empty positions next to the commas in the first and second access rules signify that the corresponding attributes are not instantiated, meaning that they remain initial (without value).

The attribute(s) specified by any of the access rules will be used as a query for searching an attribute database 260, and will therefore be referred to as query attributes. Beginning with the first access rule 252A, the system 200 is instructed to use the customer name as a query attribute. The system determines the specific instance of this query attribute from a context 270 that is associated with the data object(s) 230 that are involved in the processing. For example, the context 270 may relate to the particular business transaction 100 that is being performed, in this example the sales order 100A. Thus, when the system 200 needs to find the present instance of the customer query attribute, it learns from context 270 that customer "A" is the present customer. As another example, if the system needs to find the day of the week that the order is being entered as required by the third access rule above, it learns that from the context 270.

Having found that customer "A" is the query attribute to be used, the system attempts to match this query attribute against any of a plurality of attribute sets in the attribute database 260. In this example, the attribute database 260 comprises a first attribute set 260A, a second attribute set 260B, a third attribute set 260C and a fourth attribute set 260D. Each attribute set comprises one or more specific attributes and identifies a particular rule in the rule database 240.

For example, the first attribute set 260A may identify the first rule 242A. Moreover, the first attribute set 260A may comprise the customer query attribute being "A" and all other query attributes being initial. Similarly, the second attribute set 260B may identify the second rule 242B and may comprise the product query attribute being "1" and all other query attributes being initial. The third attribute set 260C may identify the third rule 242C and may comprise the customer query attribute being "A", the product query attribute being "1", and all other query attributes being initial. The fourth attribute set 260D may identify the second rule 242B and may comprise the customer query attribute being "A", the product query attribute being "1", the day-of-the-week query attribute being "Monday", and all other query attributes being initial. Attribute sets will be referred to using the following notion:

First attribute set: (A, ,) identifies the first rule 242A;
Second attribute set: (,1,) identifies the second rule 242B;
Third attribute set: (A, 1,) identifies the third rule 242C; and
Fourth attribute set: (A, 1, Monday) identifies the second rule 242B.

The empty positions next to the commas in the first, second and third attribute sets signify attributes that are not instantiated, meaning that they remain initial (without value). A rule can be identified by more than one attribute set. For example, the second rule 242B is identified by both the second and fourth attribute sets above.

Thus, in accordance with the first access rule 252A, the attribute database 260 is searched with the customer query attribute "A" and all other query attributes being initial. This will result in a match with the first attribute set 260A, because it comprises the customer query attribute being "A" and all other query attributes being initial. Because the first attribute set 260A in this example identifies the first rule 242A, the system will use that rule in the present business transaction 100. The rules will be described below.

A match is found only when there is correspondence in both the instantiated and the initial query attribute(s). If, for example, the second access rule 252B were used, the query attributes would be as follows:

(A, 1,).

This means that the customer query attribute is "A", the product query attribute is "1" and the day-of-the-week query attribute is initial. This would match the third attribute set 260C in the above example, because it comprises the customer query attribute being "A", the product query attribute being "1", and all other query attributes being initial. The (A, 1,) query attribute does not, however, match the first attribute set 260A even though it comprises the customer query attribute "A". This is because the first attribute set 260A requires all query attributes other than the customer to be initial. For similar reasons, this query attribute does not match the second or fourth attribute sets in the above example.

Here, the first attribute set 260A identifies the first rule 242A. The system therefore accesses this rule in the rule database 240 to determine its value. To continue the example with the sales order 100A, assume that the first rule 242A specifies that the ordered product(s) should be shipped FOB by express delivery. Accordingly, this is the particular action that the business rules specify for this specific scenario.

Any rule in the rule database 240 can be identified by any of the attribute sets in the attribute database 260. One advantage of this is that may reduce redundancy in the system. That is, a rule that applies to many different customers and products, to name just a few examples, need only be created once in the rule database 240. The different situations in which the rule applies are covered by combinations of particular access procedures and specific attribute sets.

The system may identify a different business rule, however, if a different sequence is used in the access procedure. Assume, for example, that the second access procedure 254 comprises the same access rules (252A, 252B and 252C) as does the first access procedure 252, but with a different sequence wherein the third access rule is applied first. That is, the second access procedure 254 may comprise the access rules being applied in the following order:

Third access rule: (Customer, Product, Day);
First access rule: (Customer, ,); and
Second access rule: (Customer, Product,).

For clarity, the ordinals "third," "first" and "second" are kept the same as in the first example.

Beginning, therefore, with the third access rule 252C, the system determines the query attributes from the context 270. In this example, the customer name is "A" and the product number is "1" as before. Assume also that the order is being processed on a Monday. The query attributes are therefore as follows:

(A, 1, Monday).

These query attributes do not match the first, second or third attribute sets because those sets require one or more of the attributes to be initial, whereas all three of the present attributes are instantiated. The query attributes do, however, match the fourth attribute set 260D because it comprises the customer query attribute being "A", the product query attribute being "1" and the day-of-the-week query attribute being "Monday". The fourth attribute set 260D identifies the second rule 242B and this is therefore the rule that is applied in this example. Accordingly, a different access procedure may result in a different rule being identified.

An attribute set can comprise a single attribute (see the first and second attribute sets above). Moreover, there are several important points about access rules:

An access rule can comprise an attribute that is common with another access rule in the same access procedure (see the first and second access rules for which the customer query attribute is common);

An access rule can be similar to another access rule except for one attribute that is different (see the first and second access rules);

An access rule can have a different number of instantiated query attributes than another access rule in the same access procedure (see the first, second and third access rules);

An access procedure can have access rules that comprise incrementally fewer query attributes toward the end of the sequence. This means that if the specific access rules at the beginning of the sequence (those having more query attributes) do not result in a match, then the more general access rules toward the end of the sequence (those having fewer query attributes) will be used; and Attributes can be of many different kinds, including customer, product, time, day, country, currency, to name just a few examples.

While a particular access procedure that is used need not include all (or even any) of these features, they illustrate the flexibility and usefulness of the systems and techniques described herein.

The attribute database 260 can include time dependent attribute sets. That is, one or more of the attribute sets 260A, 260B, and so on, may be associated with a time interval during which it or they are valid. For example, the first attribute set 260A may have a "valid from" variable set with a specific date (or time) and a "valid until" variable set with another date (or time). Consequently, a time dependent attribute set is taken into account only if the point of time at which the rule is to be applied is within the validity range. One advantage of this is that an attribute set that will become applicable in the future can be added to the attribute database 260 ahead of time. Moreover, if a transaction that is processed today includes taking an action during the future validity period, the time dependent attribute set is used to select a business rule for the action.

Input functions 280 relate to modeling the rules in the rule database 240 as well as creating the access procedures 260 and the attribute database 270. They will be described below with regard to FIGS. 4-6.

Figures 3, 4:
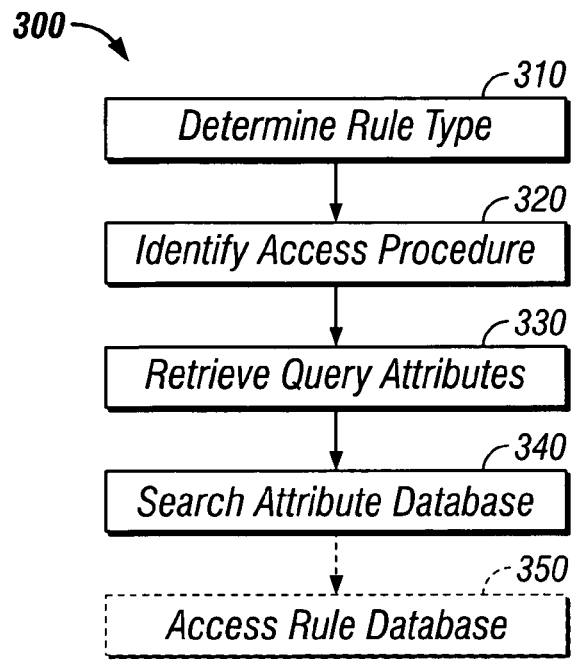
FIG. 3 is a flow chart of a method of using business rules.
FIG. 4 is a conceptual screen display of an input function for modeling business rules.

FIG. 3 is a flow chart of a method 300 of using a business rule. Preferably, the method 300 is performed by the system 200. For example, a computer program product in the system may contain instructions that cause a processor of the system 200 to perform the steps of method 300.

As shown in FIG. 3, method 300 includes the following steps:

Determining 310 the rule type 242 that is needed by the computer system 200 in selecting a particular action to be taken with regard to a data object 230.

Identifying 320 the access procedure 252 associated with the rule type. The access procedure specifies which query attributes are to be used. The access procedure comprises a sequence of access rules 252A-C, each of which identifies at least one of the query attributes to be used.

Retrieving 330 the query attributes from the context 270 associated with the data object 230.

Searching 340 the attribute database 260 with at least one of the query attributes identified by the first access rule 252A of the first access procedure 252.

If the at least one of the query attributes identified by the first access rule 252A matches the first attribute set 260A in the attribute database, accessing in the rule database 240 the first rule 242A that belongs to the rule type 242 and that is identified by the first attribute set 260A. The first rule 242A specifies the particular action to be taken by the computer system 200 with regard to the data object 230. Each of the plurality of rules in the rule database 240 is capable of being identified by any of the plurality of attribute sets in the attribute database 260.

One advantage of the system and techniques described herein is that the relevant components can be conveniently created and edited to fit the particular needs of the organization. The system 200 shown in FIG. 2 above contains input functions 280 that can be used for these purposes. A first input function 280A that can be presented on display device 210 is shown in FIG. 4. The first input function 280A is labeled "Modeling Rules" in this example and lets the user create a rule database 240. The function 280A comprises a rule modeling area 400 where the user can formulate any number of rules to be included in the rule database. A rule type column 410 lets the user specify the rule type that the new (or modified) rule belongs to. In this example, the rules in the area 400 are shipping rules. A rule number column 420 lets the user specify several rules of the same type and assign them different identifiers (here, numbers). The rule number column 420 makes it possible to have more than one shipping rule, for example, such that different attribute sets can identify one or the other of the respective different shipping rules based on the query attributes.

The function 280A comprises a rule values area 430 where the user can enter the specific values that result from applying the rule. Any rule can have one or more rule values.

In this example, each of the rules has two values. A Term 1 column 430A lets the user specify a shipping priority for each of the rules. Here, rule number 1 comprises express shipping, rule number 2 comprises 24 hour shipping, and rule number 3 comprises standard shipping. Thus, one of the three values is used when its respective rule is applied. A Term 2 column 430B lets the user specify another shipping term to be applied. Here, each of the three rules comprises FOB shipping. Thus, the user can define or edit the rule(s) according to rule type, unique identifier and associated value(s).

When the user is done modeling the rule(s), an input control 440 lets the user enter the rule(s) into the system. The system receives the rule(s) and updates the rule database 240 with the new or updated rule(s). One advantage of the system and technique described herein is that redundancy is reduced so that the same rule need not exist in several identical versions. Creating or editing the rule using input function 280A is very straightforward, because it needs only be done once for each rule. Adding a new rule for a particular situation is also convenient. Once the new rule is created using function 280A, the user need only modify the attribute database 260 so that an attribute set with the query attributes relating to the particular situation identifies the new rule. The user may wish to update the access procedure 250 that applies to the rule type.

A second input function 280B that lets the user create an attribute database 260 is shown in FIG. 5. The function 280B comprises an attribute database creation area 500 where the user can formulate any number of attribute sets to be included in the attribute database. An attribute set column 510 lets the user enter identifiers for the attribute sets. In this example, the attribute sets are numbered 1, 2, 3 and 4. A query attribute(s) column 520 lets the user specify one or more instantiated query attributes for each attribute set in the area 500. The user can leave one or more query attributes initial. Here, the user has entered the same query attributes as were included in the respective exemplary attribute sets 260A-D described above. An identified rule column 530 lets the user specify which business rule should be identified by the attribute set(s). Here, the user has entered the same rules that were identified by the respective attribute sets 260A-D. Thus, the attribute sets currently being created in function 280B are identical to the attribute sets 260A-D described above. More or fewer than four attribute sets can be created at the same time using the input function 280B.

When the user is done formulating the attribute set(s), an input control 540 lets the user enter the attribute set(s) into the system. The system receives the set(s) and updates the attribute database 260 accordingly. One advantage of the system and technique described herein is that it is very convenient to specify the circumstance under which the particular rule(s) apply. The user can cause a rule to be applied in an additional situation by creating a suitable attribute set in the attribute database 260.

A third input function 280C that lets the user create an access procedure 250 is shown in FIG. 6. The function 280C comprises an access procedure creation area 600 where the user can formulate any number of access rules to be included in the access procedure. An access rule column 610 lets the user enter identifiers for the access rules. In this example, the access rules are numbered 1, 2 and 3. A query attribute(s) column 620 lets the user specify one or more query attributes for each attribute set in the area 600. Here, the user has entered the same query attributes as were included in the respective exemplary access rules 252A-C described above. Thus, the access rules currently being created in function 280C are identical to the access rules 252A-C described above. More or fewer than three access rules can be created at the same time using the input function 280C.

When the user is done formulating the access rule(s), an input control 630 lets the user enter the access rule(s) into the system. The system receives the access rule(s) and updates the access procedure(s) 250 accordingly. One advantage of the system and technique described herein is that it is very convenient to modify which attribute sets are used in particular situations. The user can cause the current query attributes to be matched with a particular attribute set (so that the rule identified by the particular attribute set is used) by creating a suitable access rule in the attribute database 260. The access rule(s) is conveniently created using function 280C.

The business transaction(s) 100 may provide simulated use of business rules. This lets the user input genuine query attributes and see which business rule the system uses for them, without there being an actual business transaction to process. That is, the user can try one or more specific query attributes, for example to verify that the correct business rule is used, without the system 200 registering any business transaction as being "real". One advantage of this is that the user can make "dry runs" of transactions involving business rules without triggering any other procedure(s) in the system associated with the real transaction, such as inventory management routines and workforce scheduling applications.

Figure 7:
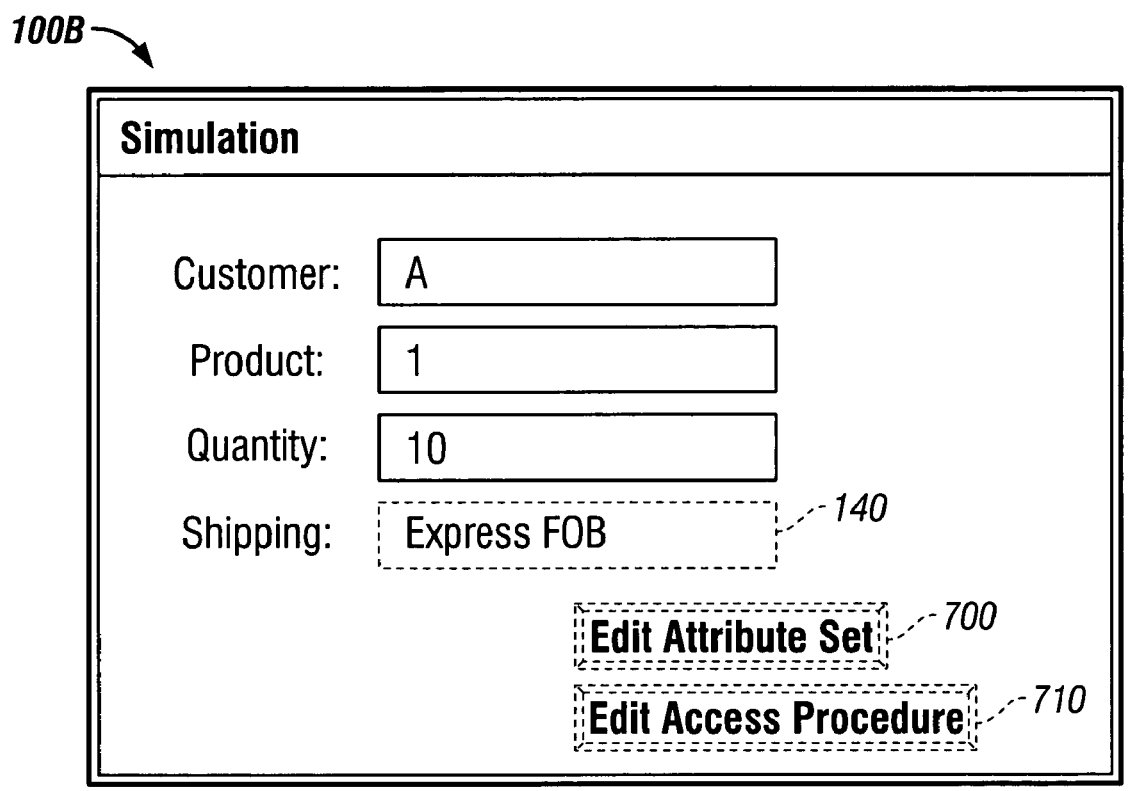
FIG. 7 is a conceptual screen display of simulating use of a business rule.

FIG. 7 shows a simulated business transaction 100B. The simulated transaction 100B is shown after the user has entered dummy attributes and caused the system to identify the applicable business rule. In this example, the dummy data are the same as in the above example of a real business transaction, the sales order 100A. In this example, the rule type is shipping rules. The user can decide which rule type to use in the simulation by selecting a simulated business transaction that specifies that rule type.

Before the business rule is applied, the simulated business transaction 100B may be similar or identical to the sales order 100A shown in FIG. 1A. That is, it may comprise input fields 110, 120 and 130 like the sales order 100A with the difference that the data input in the fields is treated as dummy data. Similar to the sales order 100A, the user can trigger the system to find the business rule that applies. The system proceeds, as described above, by determining the rule type, identifying the access procedure, retrieving the query attributes (here, the dummy data entered in transaction 100B), searching the attribute database with the dummy data identified by an access rule and, if there is a match, selecting the rule identified by the matching attribute set. If the first access rule does not lead to a match, a second access rule may be used, and so on.

FIG. 7 shows the applicable business rule value (express FOB) displayed in field 140. Accordingly, the simulated transaction 100B lets the user verify that this particular rule will be applied when this current dummy data is input in the transaction. If the user believes something is wrong with the values of this business rule, they can be corrected using input function 280A.

Assume now that the user believes the system should instead have identified a different business rule that already exists in the system. The simulated transaction 100B provides easy access to the input functions 280 so that the user can make the necessary changes in the attribute database or in the access procedure. An "Edit Attribute Set" control 700 lets the user access the input function 280B. As described above with reference to FIG. 5, the function 280B lets the user modify which rule is identified by a particular attribute set in the attribute database 260. Accordingly, the user can now make the necessary change in column 530 and enter it into the system. The user can then again run the simulated transaction 100B to verify the effect of making the change.

The simulated transaction 100B also includes an "Edit Access Procedure" control 710 that provides easy access to the input function 280C. As described above with reference to FIG. 6, the function 280C lets the user modify the query attributes identified by each access rule in the access procedure. Accordingly, the user can make any necessary change in column 620 and enter it into the system. The user can change the order of the access rules in function 280C. The user can then again run the simulated transaction 100B to verify the effect of making the change(s).

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in a computer system to identify actions with regard to data objects, the method comprising:
   determining a rule type that is needed by a computer system in selecting a particular action to be taken with regard to a data object;
   identifying an access procedure associated with the rule type that specifies which query attributes are to be used, the access procedure comprising a sequence of access rules, each of which access rules identifies at least one of the query attributes to be used;
   retrieving the query attributes from a context associated with the data object;
   searching an attribute database with at least one of the query attributes identified by a first access rule of the access procedure; and
   determining whether the at least one of the query attributes identified by the first access rule matches a first attribute set in the attribute database, and if so: (i) accessing in a rule database a first rule that belongs to the rule type and that is identified by the first attribute set, the first rule specifying the particular action to be taken by the computer system with regard to the data object, wherein each of a plurality of rules in the rule database is capable of being identified by any of a plurality of attribute sets in the attribute database; and (ii) generating an output that identifies the particular action.

2. The method of claim 1, wherein no matching attribute set exists when the attribute database is searched with the at least one of the query attributes identified by the first access rule, further comprising searching the attribute database with at least another one of the query attributes identified by a second access rule of the first access procedure.

3. The method of claim 2, wherein the at least another one of the query attributes identified by the second access rule matches a second attribute set in the attribute database, further comprising accessing in the rule database a second rule that belongs to the rule type and that is identified by the second attribute set, the second rule specifying the particular action to be taken by the computer system.

4. The method of claim 2, wherein the second access rule identifies at least one of the query attributes that is also identified by the first access rule.

5. The method of claim 1, wherein the first rule is accessed because the at least one of the query attributes identified by the first access rule matches a first attribute set in the attribute database, further comprising causing the computer system to take the particular action with regard to the data object as specified by the first rule.

6. The method of claim 5, wherein the particular action comprises shipping a product to a customer, and wherein the first rule specifies a shipping term.

7. The method of claim 1, wherein the query attributes are selected from the group consisting of: customer, product, time, day, country, currency, and combinations thereof.

8. A computer system comprising:
a rule database comprising a plurality of rules specifying particular actions that the computer system can take with regard to a data object, each of which rules belongs to one of a plurality of rule types;
an attribute database comprising a plurality of attribute sets, each of which attribute sets identifies one of the plurality of rules in the rule database, wherein each of the plurality of rules is capable of being identified by any of the plurality of attribute sets;
a plurality of access procedures specifying which query attributes are to be used in searching the attribute database, each of which access procedures is associated with one of the plurality of rule types and comprises a sequence of access rules, each of which access rules identifies at least one of the query attributes to be used; and
a device generating an output that identifies one of the particular actions.

9. The computer system of claim 8, wherein a first rule of the plurality of rules comprises a plurality of rule values and wherein the computer system uses the plurality of rule values when taking the particular action as specified by the first rule.

10. The computer system of claim 8, wherein more than one of the plurality of rules belongs to a first rule type of the plurality of rule types.

11. The computer system of claim 8, wherein the query attributes are selected from the group consisting of: customer, product, time, day, country, currency, and combinations thereof.

12. The computer system of claim 8, wherein a first attribute set in the attribute database includes one attribute.

13. The computer system of claim 8, wherein a first access procedure of the plurality of access procedures includes a first access rule and a second access rule.

14. The computer system of claim 13, wherein the sequence comprises that the first access rule be used before the second access rule.

15. The computer system of claim 13, wherein the first access rule identifies at least a first query attribute that the second access rule does not identify.

16. The computer system of claim 13, wherein the first access rule identifies at least a first query attribute that is also identified by the second access rule.

17. The computer system of claim 13, wherein the first access rule identifies a different number of the query attributes than does the second access rule.

18. The computer system of claim 17, wherein the sequence comprises that the first access rule be used before the second access rule, and wherein the second access rule identifies fewer of the query attributes than does the first access rule.

19. The computer system of claim 8, further comprising an electronic business transaction that relates to the data object and that specifies a first rule type among the plurality of rule types.

20. The computer system of claim 19, wherein a first access procedure is associated with the first rule type, and wherein the first access procedure specifies the query attributes.

21. The computer system of claim 20, wherein a first access rule of the first access procedure identifies at least one of the query attributes to be used.

22. The computer system of claim 21, wherein the at least one of the query attributes identified by the first access rule matches a first attribute set in the attribute database, and wherein the first attribute set identifies a first rule in the rule database.

23. The computer system of claim 22, wherein no attribute set in the attribute database matches the at least one of the query attributes identified by the first access rule, further comprising a second access rule of the first access procedure that identifies at least another one of the query attributes to be used.

24. The computer system of claim 19, wherein the business transaction is a sales order.

25. The computer system of claim 24, wherein the first rule type is shipping rules.

26. The computer system of claim 25, wherein a first rule belonging to the first rule type specifies a shipping term.

27. The computer system of claim 8, wherein at least one of the plurality of attribute sets is time dependent.

28. A computer system comprising:
a first input function for a user to create a rule database comprising a plurality of rules specifying particular actions that the computer system can take with regard to a data object, the first input function providing that the user can specify one of a plurality of rule types for each of the rules;
a second input function for the user to create an attribute database comprising a plurality of attribute sets, the second input function providing that the user can specify one of the plurality of rules in the rule database to be identified by each of the attribute sets, wherein each of the plurality of rules is capable of being identified by any of the plurality of attribute sets;
a third input function for the user to create a plurality of access procedures specifying which query attributes are to be used in searching the attribute database, the third input function providing that the user can associate each of the access procedures with one of the plurality of rule types and define a sequence of access rules for each of the access procedures, the third input function further providing that the user can specify at least one of the query attributes to be identified by each of the access rules; and
at least one storage device for storing the rule database, the attribute database, and the plurality of access procedures.

29. The computer system of claim 28, wherein the user can perform a simulated access to at least one of the plurality of business rules.

30. The computer system of claim 29, wherein the simulated access provides that the user can specify a first rule type of the plurality of rule types and specify the query attributes to be used, and wherein the simulated access results in a first rule of the plurality of rules being identified by a first attribute set of the plurality of attribute sets.

31. The computer system of claim 30, wherein the second input function provides that the user can modify the first attribute set to identify a different one of the plurality of rules.

32. The computer system of claim 30, wherein the third input function provides that the user can modify a first access procedure in which the first attribute set was matched with at least one of the query attributes.

33. A computer program product embodied in a physical machine-readable storage medium and containing executable instructions that when executed cause a processor to perform operations comprising:

determine a rule type that is needed by a computer system in selecting a particular action to be taken with regard to a data object;

identify an access procedure associated with the rule type that specifies which query attributes are to be used, the access procedure comprising a sequence of access rules, each of which access rules identifies at least one of the query attributes to be used;

retrieve the query attributes from a context associated with the data object;

search an attribute database with at least one of the query attributes identified by a first access rule of the access procedure; and determine whether the at least one of the query attributes identified by the first access rule matches a first attribute set in the attribute database, and if so: (i) access in a rule database a first rule that belongs to the rule type and that is identified by the first attribute set, the first rule specifying the particular action to be taken by the computer system with regard to the data object, wherein each of a plurality of rules in the rule database is capable of being identified by any of a plurality of attribute sets in the attribute database; and (ii) generate an output that identifies the particular action.

* * * * *